(12) United States Patent
Seroussi (10) Patent No.: US 6,252,960 B1
(45) Date of Patent: Jun. 26, 2001

(54) COMPRESSION AND DECOMPRESSION OF ELLIPTIC CURVE DATA POINTS

(75) Inventor: Gadiel Seroussi, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,209

(22) Filed: Aug. 4, 1998

(51) Int. Cl.[7] .................................... H04L 9/30
(52) U.S. Cl. ........................ 380/30; 713/180; 708/492
(58) Field of Search ........................ 380/30; 713/168, 713/176, 180; 708/492

(56) References Cited

U.S. PATENT DOCUMENTS 6,141,420 * 10/2000 Vanstone et al. .................... 380/30

OTHER PUBLICATIONS

Blake et al, Elliptic Curves in Cryptography, Cambridge University Press, 1999.*
Enge, Elliptic Curves and their Applications to Cryptography, Kluwer Academic Publishers, 1999.*
Seroussi, Compact Representation of Elliptic Curve Points over F_{2^n}, Hewlett–Packard Company, 1998.*
IEEE P 1363 Working Draft—Feb. 6, 1997; pp. 13–16 and 40–45.
Alfred Menezes, Auburn University; "Elliptic Curve Public Key Cryptosystems", pp. 22–23; The Kluwer International Series in Engineering and Computer Science, Kluwer Academic Publishers 1993.

* cited by examiner

Primary Examiner—Gilberto Barron, Jr.
Assistant Examiner—Jeffrey S. Leaning
(74) Attorney, Agent, or Firm—Marc P. Schuyler (57) ABSTRACT

In elliptic curve processing systems, information is typically processed to yield elliptic curve data points, with X and Y coordinates each represented by N bits, N typically being 160 or more. Valid Y coordinates must satisfy a quadratic equation for any given X coordinate, such that any Y data may be represented by its corresponding X coordinate and a single additional byte or bit. In accordance with this disclosure, a vector t is chosen for which the dot product between t and any X coordinate is equal to a constant. The vector t is used in a compression mode of the preferred embodiment to select a bit position in X coordinate data with the X bit at that location being discarded and the Y coordinate information being stored in its place. As a result, an extra byte of data is not needed and any elliptic curve data point may be represented by N bits only. In a decompression mode of the preferred embodiment, the vector t and the constant are calculated and used both to extract and fully reconstruct Y coordinate information and to reproduce the previously discarded X coordinate bit. The system disclosed herein has application to elliptic curve cryptography.

21 Claims, 4 Drawing Sheets

COMPRESSION AND DECOMPRESSION OF ELLIPTIC CURVE DATA POINTS

The present invention relates to the subject of compression and decompression. In particular, this disclosure provides for compression and decompression of elliptic curve data points such as might be used in electronic cryptography systems, where information (usually in the form of a text message, a digital signature or key, or other information) is encoded or decoded.

BACKGROUND

Cryptography systems are commonly used for providing secret communication of a text message or a cryptographic "key," or for authenticating identity of a sender via a digital signature. Once encoded, information is generally stored in a computer file (on a disk, for example) or transmitted to a desired recipient. So-called "public key cryptography" uses two asymmetric "keys," or large numbers, consisting of a public key and private key pair. If the public key is used to encode information according to a known algorithm, then the private key is usually needed by the recipient to decode that information, and vice-versa. Public key cryptography relies upon complex mathematical functions by which the public and private keys are related, such that it is extremely difficult to derive the private key from the public key, even with today's high speed processing computers.

One type of public key cryptography system is based upon elliptic curve representations and related mathematics and processing. As an end product of such processing, at least one coded block of information is created and represented as a data point having both X and Y coordinates, with each coordinate being a number between zero and $2^N-1$; if a large quantity of information is to be enciphered, there may be many such points, each point represented by at least 2N bits of information. For typical present day elliptic curve cryptography systems, N is typically on the order of one hundred and sixty, and future applications may use a much greater value for N.

In these cryptographic systems, a finite field is also chosen $$F_{2^N},$$

where N denotes the number of binary bits used by a computer to represent an element of the finite field. An irreducible generator polynomial or order N is then selected which defines the arithmetic operations in the field. The coefficients of an equation defining an elliptic curve are then selected, and a point P (having X and Y coordinates) on the elliptic curve. Once these terms are chosen, a "point addition" operation is defined, and from it a "point and multiplication" operation is thereby defined, $$kP=P+P+P+ \ldots +P,$$

i.e., P is added to itself P−1 times. With these terms, a private key consisting of one number, such as the number k, and a public key consisting of the product of the point P and the private key (the product being constrained by the finite field and the elliptic curve chosen) may be selected and used for public key cryptographic applications.

Cryptography generally does not address compact storage or transmission of data, which is the subject of "data compression." Data which is "compressed" occupies relatively less storage space and requires fewer transmission resources (i.e., time, bandwidth, storage, etc.) than uncompressed data. Without compression, transmission of relatively more information can lead to greater consumption of resources and frequency of errors. Modern day cryptography systems typically do not rely upon data compression, and they therefore leave some room for improvement.

Accordingly, a need exists for an elliptic curve processing system that compresses and decompresses coded data to a greater extent than known systems. Such a system should have application to cryptography systems which rely upon or process elliptic curve representations, enabling more efficient storage and transmission of encoded data. Still further, such a system should have the capability of compressing X and Y elliptic curve data coordinates, each having N bits, to a single representation having at most N bits in the aggregate. The present invention solves this need and provides further, related advantages.

SUMMARY

The present invention solves the foregoing needs by providing methods for compressing and decompressing elliptic curve data points, such that X and Y coordinates normally each represented by N bits of data each may be represented by N bits in the aggregate. Accordingly, the present invention provides for more efficient storage and transmission of elliptic curve data, and should find ready application to cryptography systems used in secret exchange of symmetric or asymmetric keys in particular.

One form of the present invention provides a method of compressing elliptic curve X and Y coordinate data, the X coordinate data consisting of N bits and the Y coordinate data consisting of at least 1 bit. Normally, elliptic curve processing systems use a predefined generator polynomial which identifies the finite field, as well as at least one predefined elliptic curve constant which identifies the elliptic curve. Given this information, this first form of the invention relies upon a vector which is constant for the finite field of interest and which satisfies the constraint that the product of the vector with any X coordinate data equals a constant (e.g., a special trace which is derived from the one or more elliptic curve constants). In response to the vector, a particular bit position of the X coordinate data is selected and discarded, and a binary value representing Y coordinate data is inserted in the particular bit position. This first form of the invention outputs the elliptic curve data as compressed data having no more than N bits, yet which represents a complete X and Y coordinate pair.

In more particular features of the invention, X and Y coordinates provided as elliptic curve coordinate data may each consist of N bits of data. The Y coordinate is identified as one of two possible quadratic solutions for the elliptic curve under consideration, and is replaced with a single binary bit of data which enables full reconstruction of the correct Y coordinate value. The method also may be implemented as instructions stored on machine readable media, e.g., as software or firmware, or with the assistance of digital hardware.

In still more specific features of the invention, the vector used to select a particular bit position can be computed based on the traces of the powers of a "generator." The vector may be pre-supplied as a header for a compressed elliptic curve point, stored in a specific location (e.g., in a file or on a public website), or may be calculated only as to the number of bits needed to select the particular bit position. Importantly, in certain cases, e.g., where N is odd, the least significant bit ("LSB") of the vector will necessarily be equal to "one," and so full computation of a vector is not required, but the particular bit position can be selected based on inherent selection of a vector (e.g., having a LSB equal to "one"). Alternatively, if computed by the system, the trace of each power of a generator can be computed from smallest to largest power, only until the first "one" is determined. Each of these features is encompassed by the present invention.

A second form of the invention provides a method of decompressing an elliptic curve data point having X and Y coordinates, but represented by N bits in the aggregate. In this second form of the invention, a particular bit position is also "selected" based on constraints identified above (e.g., a vector can be stored or supplied with a compressed elliptic curve data point), and used to provide a Y coordinate value. From a special trace value computed for the elliptic curve, the true value of a X coordinate bit (for the particular bit position) can be derived, enabling full reconstruction of N bits of X coordinate data. The bit representing the Y coordinate value may be used, together with a quadratic equation for the elliptic curve, to completely reconstruct N bits of Y coordinate data.

Other forms of the invention are also defined by the claims, appended hereto.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 2 is a block diagram illustrating select elliptic curve point manipulation steps of the cryptographic system of FIG. 1; in particular, FIG. 2 shows multiplication of a N bit private key (labeled A) with a 2N bit elliptic curve data point, to yield a 2N bit product.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a system that provides for compression and for decompression of elliptic curve data points used in secret, symmetric key exchange. The invention, however, may also be applied to other types of systems as well.

I. Introduction to the Preferred System.

In accordance with the principles of the present invention, the preferred embodiment is a system that compresses or decompresses elliptic curve data points. More particularly, the preferred embodiment is adapted for use in a cryptography system that is used to exchange keys (either symmetric or asymmetric keys) that themselves are used to encrypt and decrypt text messages or other communications. The invention may be applied to other cryptography systems as well (other than to systems which merely exchange keys); for example, the present invention may also be used for digital signatures, authentication or other types of information.

In general, the preferred embodiment is intended for elliptic curve processing systems where an elliptic curve is generally represented by the following equation;

$$y^2 + xy + x^3 + a_2 x^2 + a_6 = 0,$$

where the terms $a_2$ and $a_6$ are constants from a finite field that define the particular elliptic curve. Importantly, there are other similar equations used to represent elliptic curves, sometimes with different terms than those identified above; the present invention is applicable to such equations and curves, even though all such specific instances of elliptic curves are not individually identified herein.

Compression and decompression functions are preferably implemented as different modes of the same software, that is, either on the back end of an encoding function (i.e., once information has already been encoded into X and Y coordinates), or on the front end of a decoding function (i.e., decompressing information to obtain X and Y coordinates for decoding). Below, use of encoding and decoding functions will first be described, followed by a description of how elliptic curve points are compressed and decompressed in the preferred embodiment.

A. Cryptography System Components.

Elliptic curve cryptography systems used for key exchange will be generally explained with reference to FIGS. 1 and 2. These systems are typically implemented as software or firmware running upon a computer workstation; they may also be represented using special purpose hardware or on a network or other peripheral device (e.g., on a printer, in a beeper, or as part of some other device).

Figure 1:
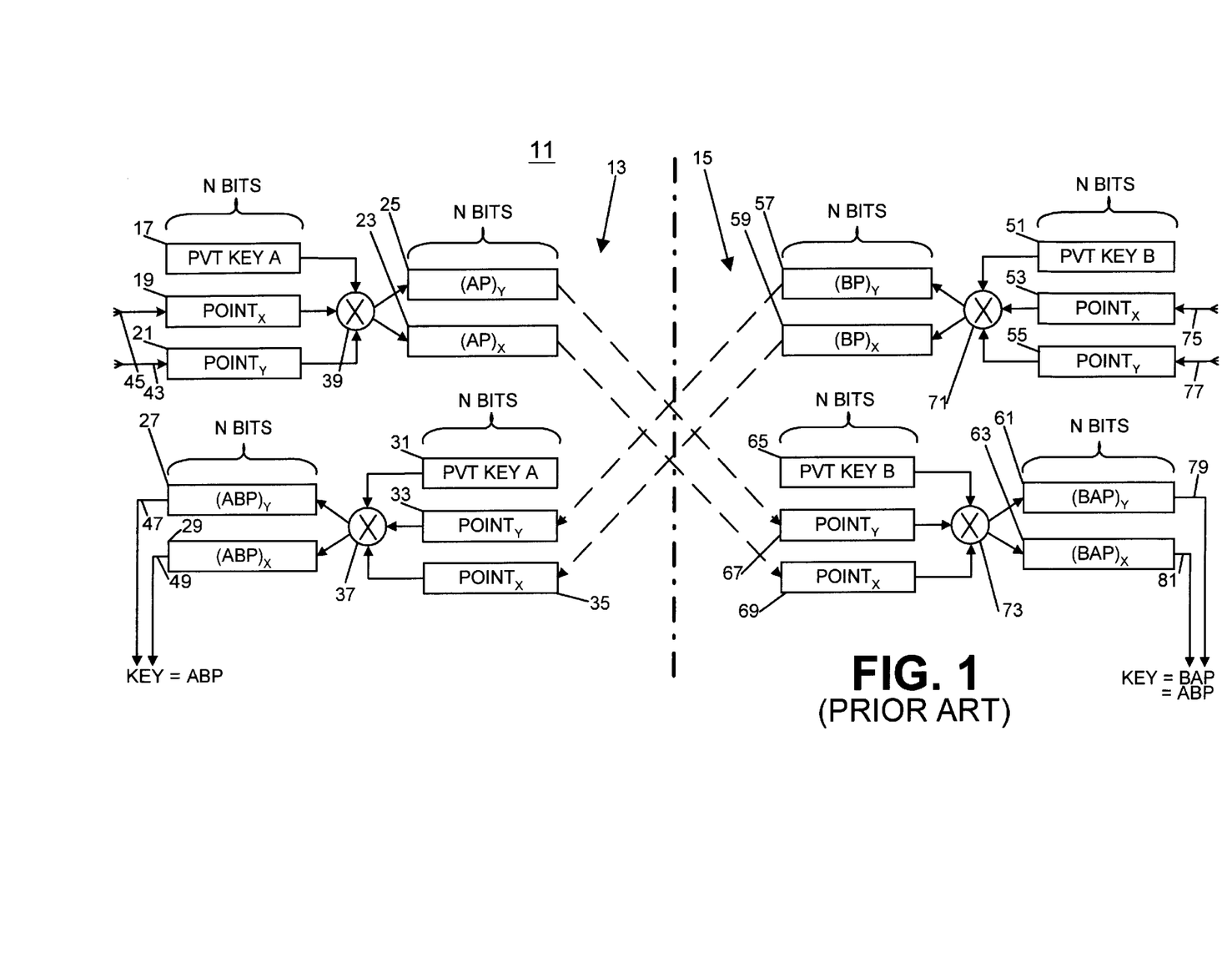
FIG. 1 illustrates operation of two elliptic curve processing systems which are used for key exchange.

FIG. 1 shows an arrangement 11 used for "Diffie-Hellman" key exchange between a first cryptography system 13 (seen at the left of FIG. 1) and a second cryptography system 15 (seen at the right). The first cryptography system should be assumed to belong to a first person who uses a private key labeled A, while the second cryptography system should be assumed to belong to a second person using a private key B. FIG. 1 illustrates how the two persons use public key cryptography to select symmetric keys which can be used to encrypt text messages or other communications between them; using this methodology, communications between the first and second persons will be indecipherable by an eavesdropper, even if the eavesdropper receives all communications relating to key exchange.

The first cryptography system 11 is seen as including a series of N bit hardware registers 17, 19, 21, 23, 25, 27, 29, 31, 33 and 35 (there may be fewer registers which are reused). These registers are manipulated under the control of software (not seen in FIG. 1) which implements multiplication and other processing functions 37 and 39 upon a microprocessor based system (e.g, a computer workstation). The software is used to receive a published elliptic curve point, represented by two N bit inputs 43 and 45, and provide a secret key via two N bit outputs 47 and 49.

Similarly, the second cryptography system 13 has registers 51, 53, 55, 57, 59, 61, 63, 65, 67, 69, receives corresponding inputs 75 and 77, and provides the same secret key as a symmetric output, as designated by reference numerals 79 and 81 in FIG. 1.

The N bit registers are used in each cryptography system to exchange each person's public key with the other person's cryptography system. In FIG. 1, the multiplication function 39 calculates the quantity AP, and places N bit X coordinate data in a first output register 23, and N bit Y coordinate data in a second output register 25; similarly, the second cryptography system calculates a public key for the second person, e.g., the quantity BP, and places N bit X coordinate data in a first output register 59, and N bit Y coordinate data in a second output register 57. Of course, each system can store its public key locally or have its public key published as part of a "certificate" and, therefore, the calculation of that key need take place only once, and the public key may be stored in memory such as upon a computer hard disk.

Elliptic curve cryptography systems in particular are based on the premise that it is computationally infeasible to derive either A or B from the two products mentioned above; the point P is a number having many different multiples (e.g., $2^{150}$ where N~160).

For encrypted communication of a symmetric key pair, the first and second persons use their respective cryptography systems 13 and 15 to exchange their public keys, such that the first person possesses the second person's public key (BP), which is an elliptic curve point having N bits each of X and Y coordinates, and the second person possesses the first's key (AP) also having 2N bits of data. As indicated by the multiplication functions 37 and 73, each person multiplies their private key with the other's public key, such that the first person possesses the product ABP (an elliptic curve point) and the second person possesses the product BAP, these quantities respectively being stored in registers 27,29 and 61,63. Both of these quantities are equal to each other, and are used as the secret key provided as outputs 47,49 and 79,81, respectively. An eavesdropper viewing all communications between the first and second persons would see both AP and BP and would be in possession of the published point P, but would be able to compute neither the symmetric keys from these quantities, nor either person's private key.

In the typical cryptography systems just described, terms k and kP are generally used as private and public keys, respectively, where k is either A or B in FIG. 1, and P is a publicly known fixed point on the elliptic curve. The points P and kP each have a X coordinate and a Y coordinate, and all five of the representations k, $P_x$, $P_y$, $(kP)_x$ and $(kP)_y$ are numbers having N bits, with the latter four quantities being elements within the finite field $F_2N$. Proper decoding by the recipient's cryptography system as just described requires certain assumptions, notably that certain predefined parameters are common to both of the sender's and recipient's cryptography systems, as represented by various inputs to the two cryptography systems 13 and 15 of FIG. 1. That is to say, both systems must employ the same finite field Fit, the same generator polynomial H(g) the same elliptic curve (as defined by constants $a_2$ and $a_6$), and the same point P on the curve. Typically, this information is defined in a header block that accompanies the transmission or file storage of the elliptic curve data points, and that header block is used to configure the recipient's cryptography (and decompression) system before processing begins.

Figure 2:
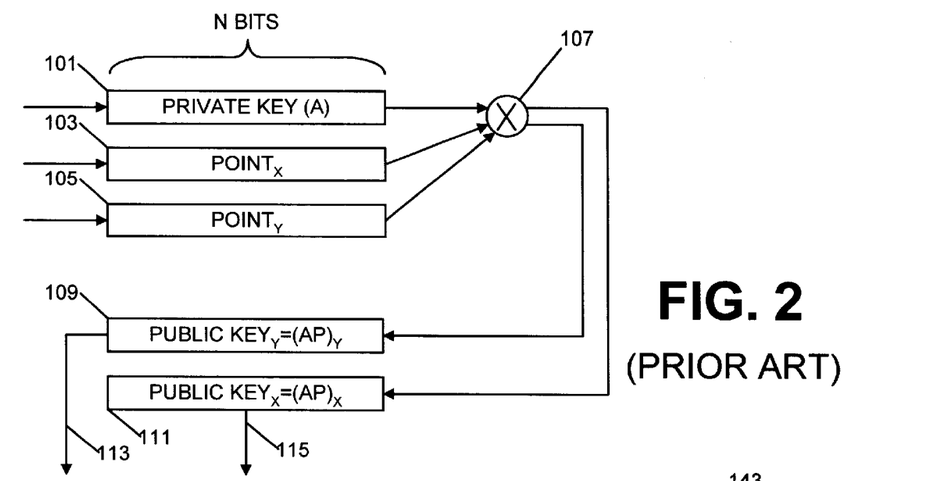

Common data processing by elliptic curve systems is further illustrated in FIG. 2, which shows operations typically performed by the sender's firmware or software upon contents of different registers 101, 103, 105, 109 and 111. In particular, the software performs mathematical operations in elliptic curve space upon the contents of registers 101, 103 and 105 used for data inputs, to place at least one data point into two output registers 109 and 111. Each of the registers 101, 103, 105, 109 and 111 seen in FIG. 2 are N bit registers, corresponding to order of the selected finite field, $F_2N$ Importantly, general mathematical rules for addition, multiplication, subtraction and division are not normally used when dealing with elliptic curves and, instead, special mathematical rules are used. For example, when adding together points $P_1$ and $P_2$ using normal mathematical rules, each point having coordinates $[X_1, Y_1]$ and $[X_2, Y_2]$, respectively, one would conventionally separately add the X and Y coordinates, i.e., $P'=[X_1+X_2, Y_1+Y_2]$. With elliptic curve math, however, the point P' would instead be given by an equation similar to the following $$P' = [X_3, Y_3],$$

$$X_3 = \frac{(Y_2+Y_1)^2}{(X_2+X_1)^2} + \frac{(Y_2+Y_1)}{(X_2+X_1)} + X_1 + X_2 + a_2,$$

and $$Y_3 = \frac{(Y_2+Y_1)}{(X_2+X_1)}(X_1+X_3) + X_3 + Y_1,$$

valid for cases where the two points are not equal, i.e., where $P_1$ and $P_2$ are not the same point (similar formulas are available for the case where $P_1=P_2$, see generally, *Elliptic Curve Public Key Cryptosystems,* by Alfred Menezes, Kluwer Academic Publishers, 1993, which is hereby incorporated by reference as though set forth herein). Addition, multiplication and inversion operations used in these formulas obey the rules of finite field $F_2N$ arithmetic, and not usual integer arithmetic. These formulas are referenced herein only to indicate the relative complexity associated with elliptic curve mathematics and processing. The points on the curve, together with the mentioned point addition operation, and a postulated point at infinity a, form an algebraic structure known as a "group." Mathematical rules for adding elliptic curve points are generally well understood in the art, and are mentioned here simply in aid of an understanding that, while the rules are complex, certain processing advantages are gained by their use.

Among those advantages, addition of two binary numbers in $F_2N$ is typically performed by applying a bit-wise exclusive-OR to corresponding bits. Furthermore, the mathematical rules used for $F_2N$ for the elliptic curve systems of interest also result in the following mathematical relation;

$$(A+B)^2=A^2+B^2.$$

The importance and use of these relations to the operation of the preferred embodiment will be further discussed below.

The coefficients $a_2$ and $a_6$ are selected so that the elliptic curve group (all of the points lying on the curve) contains a large cyclic sub-group of prime order. For the chosen elliptic curve, the number of all of the points falling on the curve is calculated according to a known algorithm, and used to test appropriateness of the particular elliptic curve for cryptographic applications (e.g., whether there are a sufficiently large number of points in the prime subgroup). The number of points on the curve will be very large, i.e., falling within the range $$2^N+1\pm 2\sqrt{2^N}.$$

If the curve is properly selected, this number will be the multiple of a large prime number p (used as the modulus of the system) and a small integer. A point P, being of the order of the prime number, is then chosen and used as the generator of the cyclic sub-group. A multiplication operation can then be defined by the relation $$kP=P+P+P+\ldots+P.$$

P being a generator means that any other point Q in the subgroup can be expressed as Q=k'P for some k' in the range $0 \leq k' < p$. Also, k'P≠∞ for $1 \leq k' < p$ and 0·P=pP=∞. With well chosen curve parameters, if k and P are given it is fairly easy to compute kP but the inverse problem, i.e., the inverse logarithm problem of recovering k from kP, is computationally unfeasible.

Returning to FIG. 2, 2N bits representing an elliptic curve point are stored in two registers 103 and 105 for processing; this point may be either the generator point P (which is generally published for any elliptic curve system), or it may be another point such as the public key of another person, e.g., AP or BP from the example above. A point multiplication function 107 implemented in software processes this point using a private key from registers 101, and places X and Y coordinates for a resultant point into registers 109 and 111, for use as two N bit outputs 113 and 115. In the case of a public key, these two N bit numbers may be stored locally, transmitted, or stored in a public repository, e.g., as part of a user's published certificate and used by others as a counterpart to the user's private key. The public and private keys may be used in exchange of symmetric keys, as was discussed above in connection with FIG. 1.

With elliptic curve point processing functions thus described, the compression and decompression modes of the preferred embodiment will now be described in additional detail.

B. Compression and Decompression Components.

The compression and decompression operations of the preferred embodiment will be explained with reference to FIGS. 3–6.

Figure 3:
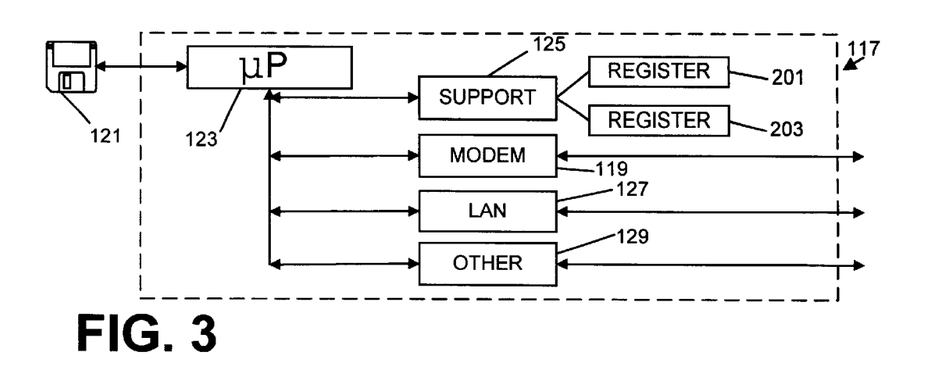
FIG. 3 is a functional diagram which shows elements of the preferred embodiment used to perform compression and decompression.

As seen in FIG. 3, a computer 117 runs suitable software or firmware which implements cryptography, compression and decompression functions, for example, as might be used in saving data to or retrieving data from a disk 121, for transmission to or from another computer via a modem 119, network connection (e.g., a local area network or "LAN") 127, or some other connection 129. The computer includes at least one microprocessor 123 or microcontroller, as well as support chips including memory 125 to store the software or firmware. Preferably, this software or firmware performs both functions of encoding an outgoing message (e.g., a key) into elliptic curve data points, and of processing elliptic curve data points into a received message (e.g., a key). The support chips include at least two registers 201 and 203 which are preferably controlled by software in aid of the compression and decompression functions of the preferred embodiment.

Figure 4:
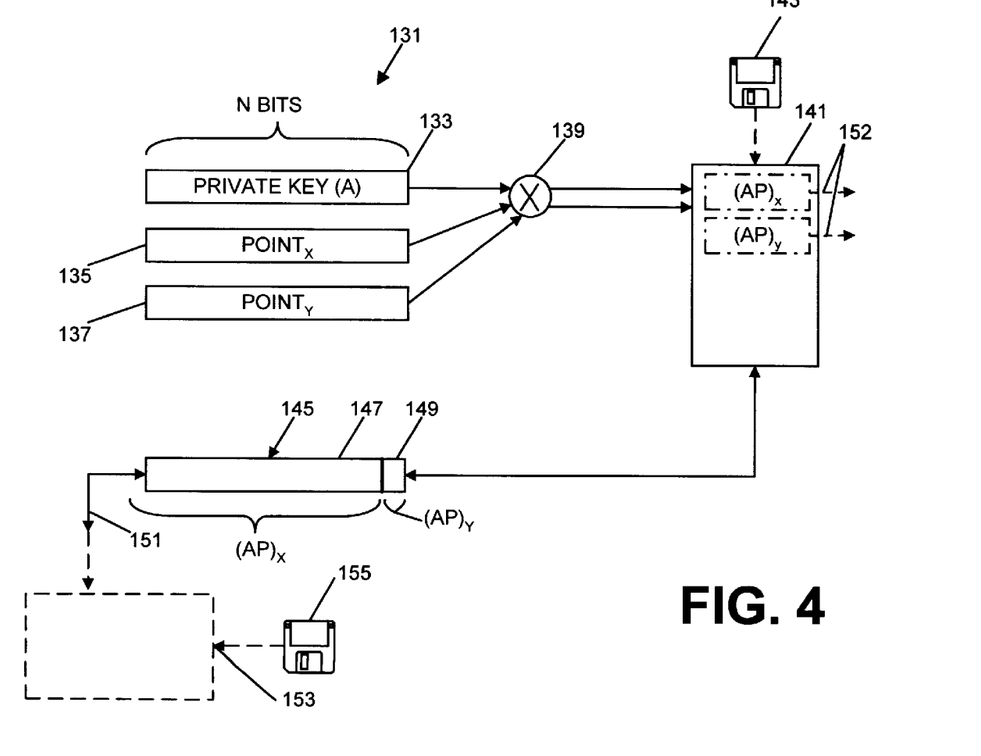
FIG. 4 is a block diagram similar to FIG. 2, but which illustrates operation of the preferred embodiment.

FIG. 4 shows a figure which is similar to FIG. 2, but which illustrates effects of instructions stored on machine readable media to compress or decompress an elliptic curve data point. More particularly, a system 131 includes control logic which controls various N bit registers 133, 135, 137 and 145 (where N is typically about 160 or more, and each register may be made up of several smaller registers, for example, 32 bit registers). Control over register contents and the various operations seen in FIG. 4 is achieved by actions of the control logic, i.e., the microprocessor or microcontroller supported by hardware, software or firmware as described with reference to FIG. 3.

In accordance with known elliptic curve information processing techniques, the N bit registers 133, 135 and 137 are loaded respectively with a private key, A, and the X and Y coordinates of an elliptic curve point such as the generator, a public key or other data as appropriate. Elliptic curve processing software processes this data, including via use of a multiplication operation 139, and functions which implement a modulus and other elliptic curve processing parameters. The elliptic curve point is provided as two N bit values $(AP)_x$ and $(AP)_y$, indicated by dashed lines at the right FIG. 4, as would be conventional. At that point, however, software stored on machine readable media 143 implementing the present invention is used to compress the two N bit values $(AP)_x$ and $(AP)_y$ into a single N bit value for storage or output (indicated by arrows 152). As series of functions, represented by the reference numeral 141 in FIG. 4, is used to select a special vector t having the property that its product with any given X coordinate value of points in the subgroup generated by P equals a constant. This special vector will be constant for the elliptic curve system of interest, i.e., it does not vary with the private key used; as a consequence, this special vector need be calculated only once and may be stored in memory for future use, or it may be placed in the header of a public key or a certificate (for use in decompressing elliptic curve data points). Therefore, as used in connection with the vector t of the present invention, the term "select" indicates that the special vector may be pre-supplied with the elliptic curve processing system, stored as a header for elliptic curve data or a certificate, or otherwise calculated or supplied for or with messages that are to be compressed or decompressed.

Also, for any given X coordinate, the elliptic curve equation constrains the Y coordinate value to the following relation $$y^2+c_1y+c_2=0$$

such that the Y coordinate value has only two possible values; in systems based on the finite field $F_2N$, the two solutions of Y will necessarily be $Y_1$ and $Y_2=Y_1+X$. The preferred system uses this information to assign a binary value of "one" to the Y coordinate if its value matches a particular one of the two quadratic equation solutions. Any coding scheme which distinguishes between the two Y coordinate values may be utilized, and choice as to how to encode the Y coordinate as a binary bit is considered a matter of design choice.

The special vector t referenced above satisfies the property that its dot product with any X coordinate of a point in the subgroup generated by P equals a trace value which is constant for the given elliptic curve; for the elliptic curve representation $$y^2+xy+x_3+a_2x^2+a_6=0,$$

the constant value preferably used for the elliptic curve is the trace of $a_2$, such that $$X \cdot t = Tr(a_2),$$

valid only for points in the cyclic sub-group. The compression software uses the vector t to select and remove a single bit from the X coordinate value, the bit chosen according to a predetermined selection process. The software discards this predetermined bit, and replaces it with the single binary value representing the Y coordinate value. As its final output, the system provides a single N bit value which fully represents the encoded message (i.e., both a N bit X coordinate value, as well as a N bit Y coordinate value). This output 91 is indicated in FIG. 4 to be the contents of a N bit output register 145, with N−1 bit positions 147 used to represent the X coordinate value and exactly one bit position 149 used to represent the Y coordinate value (this position 149 is illustrated at the right side of the register, but the position could be anywhere within the various X coordinate bits as long as its location can be derived according to a predetermined selection process). Importantly, storing the Y coordinate value in this manner eliminates the need for sending more than N bits of data for an elliptic curve point, since if an X bit is not dropped and replaced by the Y coordinate value, at least one extra bit of data would be required for representing an elliptic curve point (in practice, the requirement for an extra bit usually will require use of a full byte or larger computer word).

Decompression software 155 can be used in a process 153 to recover both the full X coordinate value and the full Y coordinate value from the N bit output 151. The functions of decompression software are also represented by FIG. 4, except that the direction of operations are reversed. For example, the N bit register 145 would contain a system input, whereas the two registers (seen inside block 141) would be used to provide a system output of decoded data.

Importantly, the preferred software combines both compression and decompression software, e.g., as different modes for two-way communication or storage, as appropriate; that is to say, the preferred embodiment includes instructions which decompress data in the case of incoming compressed data, and which compress data intended for storage or transmission to another.

Further details on the operation of the preferred embodiment will be explained in additional detail below.

Figure 5:
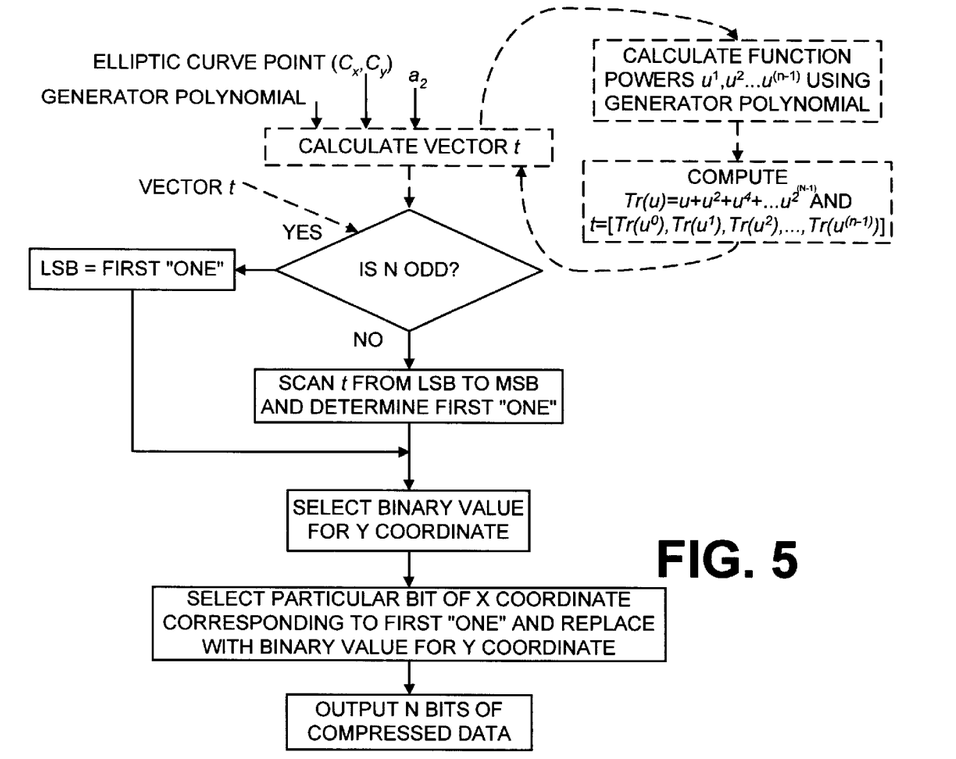
FIG. 5 is block diagram illustrating compression performed in accordance with the preferred embodiment.

II. Data Compression using the Preferred System.

Data compression upon an elliptic curve point $(C_x, C_y)$ is performed using functions depicted in FIG. 5 and two N bit registers (which were earlier labeled 201 and 203 in FIG. 3). As indicated in FIG. 5, the major computational tasks include using the vector t to drop a bit of X coordinate data and insertion of an appropriate binary value representing the Y coordinate. As indicated earlier, the vector t may be pre-supplied with the cryptography system, calculated once and stored by compression software, or calculated each time anew. Although this latter case is the least desirable (and including the vector with the system is the most desirable), the latter case will be assumed for the discussion below, to describe how the vector is calculated.

A. Calculating the Vector t.

The vector t employed in the preferred embodiment consists of the trace function of each of N powers of a root u of the generator polynomial, H(g), (i.e., with the least significant bit of the vector being the trace of $u^0$ or, in other words, the trace of "one," and the most significant bit of the vector being the trace of $u^{N-1}$). The trace function of a variable in $F_2N$ (g, for example) is defined by the following relation;

$$Tr(g)=g^{2^0}+g^{2^1}+g^{2^2}+\ldots+g^{2^{(N-1)}}.$$

Three related properties of the trace function in $F_2N$ are that
(a) the trace is always either zero or one,
(b) $Tr(g)=Tr(g^2)$,
and (c), if N is odd, then $$Tr(1)=1.$$

Thus, the vector t consists of $$t=[Tr(u^0), Tr(u^1), Tr(u^2), \ldots, Tr(u^{N-1})],$$

where u is a root of the generator polynomial H(g).

The generator polynomial (which is an irreducible polynomial, having no factors) is used to calculate each of these elements using polynomial modular reduction and the fact that, using $F_2N$ mathematical rules, addition and subtraction are equivalent to an exclusive-OR function, and the negative of a number b is equal to b, i.e., −b=b.

For example, taking the simple case where N=5, and the generator polynomial $$H(g)=g^5+g^2+1,$$

one obtains the relation $$u^5=u^2+1.$$

To understand computation of the vector t, it would be helpful to calculate the vector in this simple case where N=5 using the irreducible generator polynomial. As mentioned earlier, N in practice is usually at least 160, and calculation of the vector t would normally be performed automatically by a computer running suitable software or firmware according to well-understood mathematics.

The vector t in the above example would be defined as $$[Tr(1), Tr(u), Tr(u^2), Tr(u^3), Tr(u^4)].$$

Since N is odd, the trace of 1 equals 1, so the first element in this vector is "1." The trace of u, applying the equation for the trace function given above, becomes $$\begin{aligned}Tr(u) &= u^1 + u^2 + u^4 + u^8 + u^{16}\\ &= u + u^2 + u^4 + (u^5 u^3) + u^{16}\\ &= u + u^2 + u^4 + (u^2+1)(u^3) + u^{16}\\ &= u + u^2 + u^4 + (u^2+1+u^3) + u^{16}\\ &= u^4 + u^3 + u + 1 + u^{16}.\end{aligned}$$

It will be recalled from the discussion earlier that one of the properties of $F_2N$ math is the relation $$(A+B)^2=A^2+B^2.$$

Since $u^{16}$ is equal to $u^8$ squared, $u^{16}$ via this relation equals $u^4+1+u^6$, which leads to the following;

$$\begin{aligned}Tr(u) &= u^4 + u^3 + u + 1 + (u^4 + 1 + u^6)\\ &= (u^4+u^4)+(1+1)+u^3+u+u^6\\ &= u^3+u+(u^5)\\ &= u^3+u+(u^2+1)u\\ &= 0.\end{aligned}$$

Similarly, as noted earlier, the trace of $u^2$ equals the trace of u (and by induction, it also equals the trace of $u^4$), so these terms also are equal to zero. The trace of $u^3$ would be calculated as follows;

$$Tr(u^3)=u^3+u^6+u^{12}+u^{24}+u^{48}.$$

Given that system has 32 elements ($2^5$ elements), u satisfies the relation $u^{32}=u$; hence, $$Tr(u^3) = u^3 + u^6 + u^{12} + u^{24} + u^{17}.$$

$$Tr(u^3) = u^3 + (u^3 + u) + u^{12} + (u^{12})^2 + u^{16}u$$
$$= u + u^{12} + (u^6 + u^2)^2 + (u^5 + u + u^7)$$
$$= u + (u^4) + (u^2 + 1 + u + u^4 + u^2)$$
$$= 1.$$

Thus, with the generator polynomial as indicated above, and N=5, the vector t would be [1,0,0,1,0].

The generator polynomial may always be used to express one power of a polynomial root as a function of the other powers, and using the trace function as mentioned permits the use of N−1 equations to compute each element of the vector t as either zero or one as a matter of routine mathematical processing; thus, whether N is 5, 160 or a larger number, it becomes a relatively routine computational task to determine the traces of u and its various powers. This computation is generally a prerequisite processing task in connection with preferred compression or decompression of an elliptic curve data point, but once performed, should remain constant for the system, and may be stored for subsequent use by the system or transmitted as part of a header of compressed data.

B. The use of the Vector t.

Once the vector t is available, the preferred instructions (software or firmware) use the vector to select a particular bit location within the binary bits of X coordinate data which may be discarded. In particular, the preferred instructions scan the vector t from least significant bit (LSB) to most significant bit (MSB) to determine the first bit which is equal to one. In the example given above, it will be recalled that the vector t was determined to be [1,0,0,1,0]; the preferred instructions would, in this example, determine that the LSB is the first bit position having a value of one. [Notably, in all cases where N is an odd number, the LSB of the vector t will be one and, as indicated by FIG. 5, the preferred embodiment in such instances simply uses the LSB without any scanning of the vector. In such cases also, prior, express computation of the vector t is not specifically needed for selection of a particular bit position, since the LSB for the X coordinate value will preferably be invariably selected.]

This bit position (i.e., the LSB in the current example) is mapped over to the X coordinate data, and the same bit position as yielded the first value of "one" in the vector t is discarded from the X coordinate data. For example, in the current example, the LSB of X coordinate data would be discarded.

C. Calculating a Binary Value for the Y Coordinate.

The preferred embodiment reduces the elliptic curve equation $$y^2+xy+x^3+a_2x^2+a_6=0,$$

using the X coordinates as a constant, to obtain $$y^2+c_1y+c_2=0,$$

where $c_2=a_6+a_2X^2+X^3$ and $c_1=X$. In order to be a valid curve point, the Y coordinate data must satisfy this latter quadratic equation and be one of the (at most) two possible solutions to that equation. The preferred software encodes the actual Y coordinate data by assigning a binary bit of information to distinguish between the two possible solutions. For example, a binary one could be used to indicate the larger of the two possible solutions, with a zero indicating the lesser of the two solutions. Notably, since the two solutions are of the form $Y_1$ and $X+Y_1$, and since an exclusive-OR operation is used for addition or subtraction in $F_2N$, one Y solution may be directly used to derive the other (e.g., the software performs an exclusive-OR between the X and Y coordinates and encodes the Y coordinate as a "1" depending upon whether the result of the exclusive-OR is smaller or larger than the Y coordinate). The preferred embodiment stores the binary value in the location of the particular bit of X coordinate data which was discarded.

As a result of these tasks, the preferred embodiment produces a set of N compressed bits that completely contains all of the information necessary to extract both N bits of X coordinate data and N bits of Y coordinate data.

Using the registers 201 and 203 (seen in FIG. 3) for example, the preferred software can initially store N bits of X coordinate data and N bits of Y coordinate data; the preferred software processes the Y coordinate data and replaces it in register 203 with the single binary bit. After located a bit location within the other register 201 which may be discarded, the software moves the contents of the second register 203 to overwrite the location of the discarded bit, and uses the register 201 as an output register.

Figure 6:
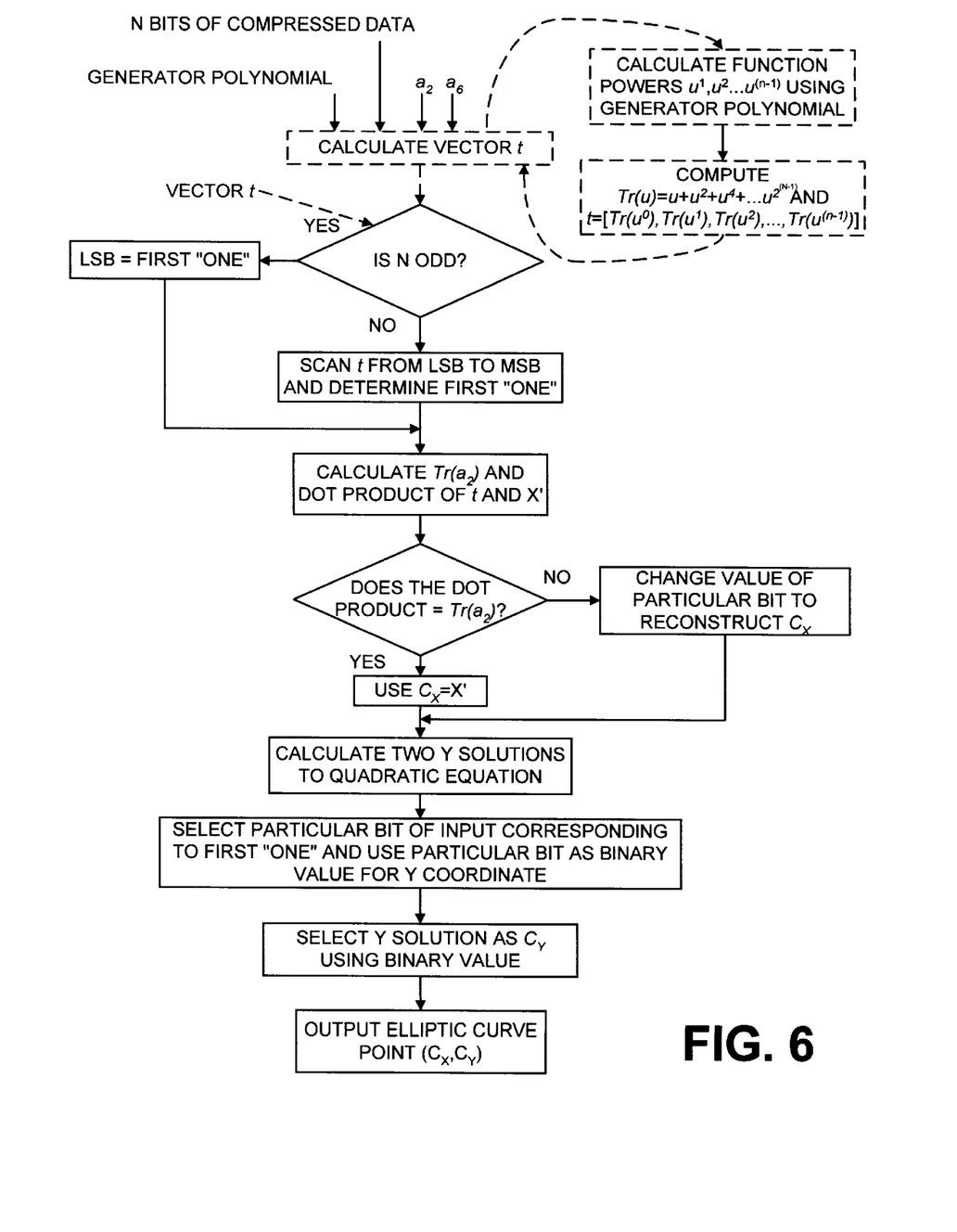
FIG. 6 is a block diagram illustrating decompression performed in accordance with the preferred embodiment.

III. Data Decompression using the Preferred System.

A header for compressed data will include information which identifies at least (a) the value of N, (b) the elliptic curve under consideration, e.g., values of the constants $a_2$ and $a_6$, and (c) the particular generator polynomial used to represent all points in the finite field. This information is used by the preferred embodiment in a decompression mode, to fully extract N bits of X coordinate data and N bits of Y coordinate data. The decompression mode is illustrated in block diagram form in FIG. 6. Importantly, the header could be pre-supplied, either by being sent together with a compressed data point, or by being made available from a fixed location.

To this effect, in its decompression mode, the preferred embodiment receives N bits of incoming data which it stores in a first register; this register may be the register 201 of FIG. 3. The preferred embodiment obtains the vector t in exactly the same manner as was specified earlier in describing the compression software, i.e., the vector is pre-supplied by the system, derived from a certificate or header, or calculated from N and the irreducible polynomial H(g). FIG. 6 indicates both pre-supply of the vector, as well as optional (phantom line) calculation of the vector t with each message. As should be apparent, calculation of the vector t may efficiently be implemented as a call function or subroutine.

Once the vector t has been calculated, the preferred embodiment calculates the dot product between the vector t and N bits of incoming data; the preferred embodiment also identifies (via the same procedures as discussed above for use in a compression mode) which particular one of the N bits holds the Y coordinate data for the elliptic curve point which has been compressed; this particular bit may be loaded into a second register, such as the register 203 of FIG. 3. The preferred embodiment also, in its decompression mode, calculates a constant trace function for the elliptic curve. In the elliptic curve under consideration, that is, a curve represented by the relation $$y^2+xy+x^3+a_2x^2+a_6=0,$$

the preferred software calculates the trace of the constant $a_2$. Notably, the elliptic curve equation has a solution in y only if the trace of $(x+a_2+a_6/x^2)$ is equal to zero; since for a generic point $P_1=(x_1,y_1)$, if $P_2=2P=(x_2,y_2)$, then, $$x_2 = x_1^2 + \frac{a_6}{x_1^2},$$

then any point of the form 2P, satisfies the condition that the trace of any valid X coordinate must equal the trace of the constant $a_2$. However, in the selected subgroup, the order p is prime and necessarily odd, which means that any element in the subgroup can be represented as twice another element in the subgroup, i.e., every point of interest is of the form $2P_1$, and the trace of $a_2$ is constant for all possible values of X for points in the subgroup.

The decompression software compares the trace of $a_2$ (which must be zero or one) with the result of the dot product between the vector t and N bits of incoming data; if the results match, then the missing X bit necessarily has the same value as the binary bit which represents the Y coordinate. In this event, the N bits of incoming data are passed without change to a N bit register (such as register 201 of FIG. 3) for use as the X coordinate data. If the results of the comparison do not match, then the missing X bit necessarily has the opposite binary value as the binary bit which represents the Y coordinate; the particular bit is replaced with the correct X coordinate bit, and the reconstituted X coordinate value is stored in an output register (i.e., it is left in register 201 of FIG. 3 for use as an output).

With the X coordinate value known, the preferred embodiment calculates the constants $c_2 = a_6 + a_2 X^2 + X^3$ and $c_1 = X$ and calculates the (at most) two solutions to the quadratic equation; using the binary bit from the second register, the preferred embodiment selects the correct Y coordinate value from these two solutions, and stores N bits of Y coordinate data in a second output register. The two N bit registers used for outputs thereby have the fully decompressed X and Y coordinates, which may be used for decoding in a cryptography system, or otherwise, as appropriate.

Importantly, there are a number of modifications that will be readily apparent to those having skill in programming or cryptography systems. For example, software implementing the present invention could be devised which relies upon prior compression of the Y data, e.g., a system which receives N+1 bits as an input, including N bits of X coordinate data and a single bit representing corresponding Y coordinate data. Also, the principles herein could potentially be used to compress X and Y data coordinates to less than N bits of data, without departing from the spirit of the present invention.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A method of compressing elliptic curve data which includes X and Y coordinate data, the X coordinate data consisting of N bits and the Y coordinate data consisting of at least 1 bit, using (a) a generator polynomial, and (b) a digital processing computer with at least first and second registers, said method comprising:

storing the X coordinate data in the first register;
   storing the Y coordinate data in the second register;
   selecting a particular bit position of the X coordinate data;
   using the digital processing computer to store a binary value representing Y coordinate data in the particular bit position;
   outputting the elliptic curve data from the digital processing computer as data having no more than N bits, yet which represents both complete X and Y coordinate values; and using the elliptic curve data for encrypting, decrypting, electronically singing, or verifying an electronic signature.

2. A method according to claim 1, further using at least one elliptic curve constant that identifies an elliptic curve, wherein the Y coordinate data also consists of N bits, and wherein using the digital processing computer to store a binary value includes:

analyzing the N bits of Y coordinate data to determine whether it represents a first possible solution to a quadratic equation or a second possible solution to a quadratic equation; and
   assigning and storing in the particular bit position of the X coordinate data
      the first binary value if the Y coordinate data represents the first possible solution, and
      the second binary value if the Y coordinate data represents the second possible solution.

3. A method according to claim 1, wherein selecting a particular bit position includes selecting a vector which is constant for the generator polynomial and which satisfies the constraint that the product of the vector with any X coordinate data equals the trace of that X coordinate data.

4. A method according to claim 3, wherein selecting a vector includes using the digital processing computer to:

determine a trace of each of 1, $u^2 \ldots u^{N-1}$, to obtain N binary results; and
   select the vector to include the N binary results;
   where u is a root of the generator polynomial.

5. A method according to claim 3, wherein the method further uses (c) a pre-supplied constant vector, and wherein selecting the vector includes:

storing the vector in memory and using the vector in multiple compressions of elliptic curve data.

6. A method according to claim 3, wherein the vector consists of N bits, and wherein selecting the particular bit position includes using the digital processing computer to:

scan the N bits of the vector in a predetermined order,
   determine a first one of the N bits having a binary value of one, and having an associated first position within the predetermined order; and
   scan the N bits representing X coordinate data, in the predetermined order, and select the particular bit position to correspond to the first position within the predetermined order.

7. A method of decompressing elliptic curve data including X and Y coordinate data, represented in the aggregate as N bits, using (a) a generator polynomial, and (b) a digital processing computer with at least first and second registers, said method comprising:

storing the N bits in the first register;
   selecting a particular bit position of the N bits and storing contents of the particular bit position in the second register;
   determining a X coordinate bit value in response to remaining ones of the N bits, and placing that X coordinate bit value in the particular bit position of the N bits to thereby obtain a decompressed X coordinate value having N bits;

using the contents of the second register to obtain at least one bit representing Y coordinate data;

outputting the elliptic curve data from the digital processing computer as X coordinate data having at least N bits and Y coordinate data having at least 1 bit; and using the elliptic curve data for encrypting, decrypting, electronically signing, or verifying an electronic signature.

8. A method according to claim 7, using at least one elliptic curve constant that identifies an elliptic curve, further comprising:

using the digital processing computer to determine two solutions to a quadratic equation based on at least one elliptic curve constant, and using the contents of the particular bit position which have been stored in the second register to select one of the two solutions.

9. A method according to claim 8, further comprising:

outputting the elliptic curve data from the digital processing computer to include 2N bits, including N bits of X coordinate data and N bits of Y coordinate data.

10. A method according to claim 7, wherein selecting a particular bit position includes selecting in response to the generator polynomial a vector which is constant for the generator polynomial and which satisfies the constraint that the product of the vector with any possible X coordinate data equals the trace of that X coordinate data.

11. A method according to claim 10, wherein selecting a vector includes using the digital processing computer to:

determine a trace of each of 1, $u^2$ ... $u^{N-1}$, to obtain N binary results; and select the vector to include the N binary results;

where u is a root of the generator polynomial.

12. A method according to claim 10, wherein the method further uses (c) a pre-supplied constant vector, and wherein selecting the vector includes:

storing the vector in memory and using the vector in multiple decompressions of elliptic curve data.

13. A method according to claim 10, wherein the vector consists of N bits, and wherein selecting the particular bit position includes using the digital processing computer to:

scan the N bits of the vector in a predetermined order, determine a first one of the N bits having a binary value of one, and having an associated first position within the predetermined order; and scan the N bits representing X and Y coordinate data in the aggregate, in the predetermined order, and select the particular bit position to correspond to the first position within the predetermined order.

14. A method according to claim 10, wherein determining a X coordinate bit value includes using the digital processing computer to:

determine a trace value that is dependent upon at least one elliptic curve constant;

multiplying at least part of the vector against remaining ones of the N bits to obtain a scalar product; and comparing the scalar product against the trace value and determining the X coordinate bit value to be one, if the trace value and the scalar product do not match, and zero, if the trace value and the scalar product do match.

15. An article of manufacture adapted to cause the compression of elliptic curve data which includes X and Y coordinate data, the X coordinate data consisting of N bits and the Y coordinate data consisting of at least 1 bit, using a generator polynomial, said article of manufacture adapted for use with a machine and a first register and a second register, comprising:

machine readable media; and instructions stored on the machine readable media that when executed control the machine to store the X coordinate data in the first register, store the Y coordinate data in the second register, select a vector which is constant and which satisfies the constraint that the product of the vector with any X coordinate data equals the trace of that X coordinate data, select in response to the constant vector a particular bit position of the X coordinate data, store a binary value representing Y coordinate data in the particular bit position, the binary value having a first binary value if the Y coordinate data if it qualifies as a first solution of a quadratic equation, and a second binary value if the Y coordinate data qualifies as a second solution of a quadratic equation, output the elliptic curve data from the digital processing computer as data having no more than N bits, yet which represents both complete X and Y coordinate values, and use the elliptic curve data for encrypting, decrypting, electronically singing, or verifying an electronic signature.

16. An article according to claim 15, wherein said instructions further include instructions that calculate the vector, by using the digital processing computer to:

determine a trace of powers of each of 1, $u^2$ ... $u^{N-1}$, to obtain N binary results; and select the vector to include the N binary results.

17. An apparatus that compresses elliptic curve data which includes X and Y coordinate data, the X coordinate data consisting of N bits and the Y coordinate data consisting of at least 1 bit, comprising:

means for selecting a vector which satisfies the constraint that the product of the vector with any X coordinate data equals the trace of that X coordinate data;

means for selecting a particular X coordinate bit position which may be reconstructed from fewer than N bits of X coordinate data;

means for storing a binary value representing Y coordinate data in the particular X coordinate bit position;

means for outputting the elliptic curve data from the digital processing computer as data having no more than N bits, yet which represents both complete X and Y coordinate values; and using the elliptic curve data for encrypting, decrypting, electronically singing, or verifying an electronic signature.

18. An article of manufacture adapted to cause the compression of elliptic curve data which includes X and Y coordinate data expressed in the aggregate as N bits, using a generator polynomial, said article of manufacture adapted for use with a machine and a first register and a second register, comprising:

machine readable media; and instructions stored on the machine readable media that when executed control the machine to store the N bits in the first register, select a vector which satisfies the constraint that the product of the vector with any possible X coordinate data equals the trace of that X coordinate data, select in response to the vector a particular bit position of the N bits and storing contents of the particular bit position in the second register, determine a X coordinate bit value in response to the vector and remaining ones of the N bits, and placing that X coordinate bit value in the particular bit position of the N bits to thereby obtain a decompressed X coordinate value having N bits, use the contents of the second register to obtain at least one bit representing Y coordinate data, output the elliptic curve data from the digital processing computer as X coordinate data having at least N bits and Y coordinate data having at least 1 bit, and use the elliptic curve data for encrypting, decrypting, electronically singing, or verifying an electronic signature.

19. An article according to claim 18, wherein said instructions further include instructions that calculate the vector, by using the digital processing computer to:

determine a trace of powers of each of 1, $u^2 \ldots u^{N-1}$, to obtain N binary results; and select the vector to include the N binary results.

20. An apparatus that decompresses elliptic curve data which includes X and Y coordinate data expressed in the aggregate as N bits, comprising:

means for selecting a vector which satisfies the constraint that the product of the vector with any possible X coordinate data equals the trace of that X coordinate data;

means for selecting in response to the vector a particular bit position of the N bits and determining from contents at the particular bit position Y coordinate data;

means for determining a X coordinate bit value in response to the vector and remaining ones of the N bits, and placing that X coordinate bit value in the particular bit position of the N bits to thereby obtain a decompressed X coordinate value having N bits; an apparatus for using the elliptic curve data for encrypting, decrypting, electronically singing, or verifying an electronic signature.

21. An apparatus according to claim 20, further comprising means for determining a Y coordinate value of N bits from a single binary value found at the particular bit position.

* * * * *